(12) United States Patent
Chhatriwala et al.

(10) Patent No.: US 7,395,080 B2
(45) Date of Patent: Jul. 1, 2008

(54) CALL PROCESSING SYSTEM AND METHOD

(75) Inventors: Murtuza Chhatriwala, San Diego, CA (US); Joseph Giacalone, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 595 days.

(21) Appl. No.: 10/903,174

(22) Filed: Jul. 30, 2004

(65) Prior Publication Data

US 2006/0025167 A1 Feb. 2, 2006

(51) Int. Cl.
*H04B 7/00* (2006.01)
*H04Q 7/20* (2006.01)

(52) U.S. Cl. ........................................ 455/518
(58) Field of Classification Search ............... 455/518
See application file for complete search history.

(56) References Cited

U.S. PATENT DOCUMENTS

| | | | |
|---|---|---|---|
| 5,841,853 A | | 11/1998 | Yamanishi et al. |
| 5,953,400 A | * | 9/1999 | Rosenthal et al. ...... 379/202.01 |
| 6,157,828 A | | 12/2000 | Krishnamurthi |
| 6,292,672 B1 | * | 9/2001 | Chavez, Jr. .................. 455/519 |
| 6,625,198 B1 | | 9/2003 | Tiedemann, Jr. et al. |
| 6,738,617 B2 | | 5/2004 | Rosen et al. |
| 6,751,468 B1 | * | 6/2004 | Heubel et al. ................ 455/518 |
| 6,898,436 B2 | * | 5/2005 | Crockett et al. ............. 455/518 |
| 6,937,856 B2 | * | 8/2005 | Baudino et al. ............. 455/418 |
| 6,996,414 B2 | * | 2/2006 | Vishwanathan et al. ..... 455/518 |
| 7,035,648 B2 | * | 4/2006 | Czaja et al. ............. 455/456.1 |
| 7,075,907 B1 | * | 7/2006 | Lintulampi ................. 370/329 |
| 7,280,502 B2 | * | 10/2007 | Allen et al. .................. 370/329 |
| 2002/0173326 A1 | * | 11/2002 | Rosen et al. ................. 455/518 |
| 2003/0148779 A1 | | 8/2003 | Aravamuden et al. |
| 2005/0122923 A1 | * | 6/2005 | Jang et al. ................... 370/310 |
| 2006/0003783 A1 | * | 1/2006 | Fukui et al. ................. 455/517 |
| 2006/0079261 A1 | * | 4/2006 | Nakamura ................... 455/518 |

OTHER PUBLICATIONS

Transport Protocols V1.1.0 (Aug. 2003), XP-00863836, Push-to-Talk over Cellular (PoC) User Plane; Transport Protocols; PoC Release 1.0, Ericsson, Motorola, Nokia, Siemens, pp. 1-37.

* cited by examiner

*Primary Examiner*—Lana N. Le
*Assistant Examiner*—Bobbak Safaipour

(57) ABSTRACT

Systems and methods are provided for sending caller ID information including a PTT signal up to a user interface module quickly, instead of first sending an incoming call alert or an incoming call alert and caller ID information without PTT information, and later sending the PTT information. A bypass alert message may be included with the caller ID information relating to the incoming call message sent from the main control task to the user interface module.

13 Claims, 4 Drawing Sheets

CALL PROCESSING SYSTEM AND METHOD

BACKGROUND OF THE INVENTION

1. Field of the Invention

The invention relates generally to wireless communications and more particularly to call processing in wireless communications.

2. Background

Consumers are increasingly demanding push to talk (PTT) functionality on wireless communication devices. Dedicated PTT wireless communication infrastructure is expensive. Consumers want an inexpensive PTT solution. A way to perform PTT calls over a voice network is needed.

Changing network infrastructure is expensive, even if the change is only a software change. It would be preferable, if possible, to implement PTT over a voice network without modifying the network very much, if at all.

A problem with PTT calls over a voice channel is that the wireless communication device may react as if a standard voice call has been received in response to the PTT call. This may result in several possible problems. First, the wireless communication device may ring. The wireless communication device is not supposed to ring in a PTT call. Second, the wireless communication device may not be able to "take the floor" in the PTT session. "Taking the floor" means making one's wireless communication device the sender, such as, for example, the speaker, while one has "the floor". Typically, only one PTT device in a PTT session (call) can be the sender at a time.

Moreover, delay in setting up a PTT session is another problem. Users want to be able to speak to the recipient of a PTT call as quickly as possible after they initiate the call. For some users, delay in call set-up time amounts to wasted time on the job. Alternatively, for some users, delay in call set-up time amounts to wasted time when they want to communication with someone personally.

SUMMARY OF THE INVENTION

In order to provide for efficient and effective PTT calls over a voice network, systems and methods are provided for sending caller ID information including a PTT signal up to a user interface module quickly, instead of first sending an incoming call alert or an incoming call alert and caller ID information without PTT information, and later sending the PTT information. A bypass alert message may be included with the caller ID information relating to the incoming call message sent from the main control task to the user interface module.

Other aspects, advantages, and novel features of the invention will become apparent from the following Detailed Description, when considered in conjunction with the accompanying drawings.

BRIEF DESCRIPTION OF THE DRAWINGS

Preferred embodiments of the present invention taught herein are illustrated by way of example, and not by way of limitation, in the figures of the accompanying drawings, in which.

DETAILED DESCRIPTION

Figure 1:
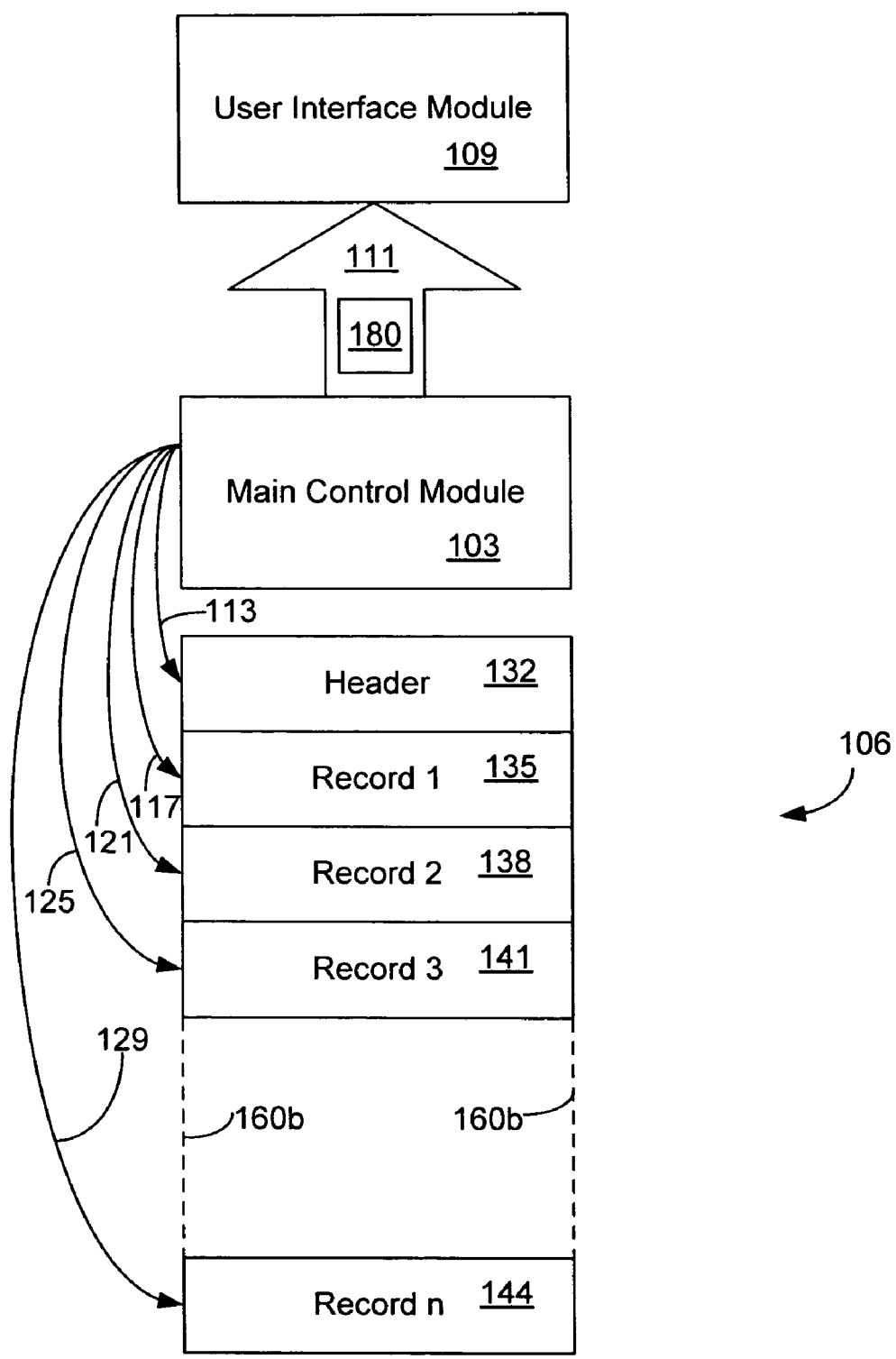
FIG. 1 shows a block diagram illustrating a main control module reading an incoming call message and notifying a user interface module regarding the incoming call message.

FIG. 1 shows a block diagram illustrating a main control module 103 reading an incoming call message 106 and notifying a user interface module 109 regarding the incoming call message 106. After reading at least a portion of the incoming call message 106, the main control module 103 sends an incoming call signal 111 to the user interface module 109. Advantageously, the incoming call signal 111 contains a PTT signal 180, as will be described later with reference to FIG. 3.

To ensure that the incoming call signal contains a PTT signal 180, the main control module 103 reads at least a PTT indicator before sending the incoming call signal 111 to the user interface module 109. The PTT indicator will be described later, with respect to FIG. 2. The main control module 103 includes the PTT signal 180 with the incoming call signal 111 that is sent to the user interface module 109. The incoming call message 106 contains a header 132, and one or more records 135, 138, 141, and 144.

Figure 2:
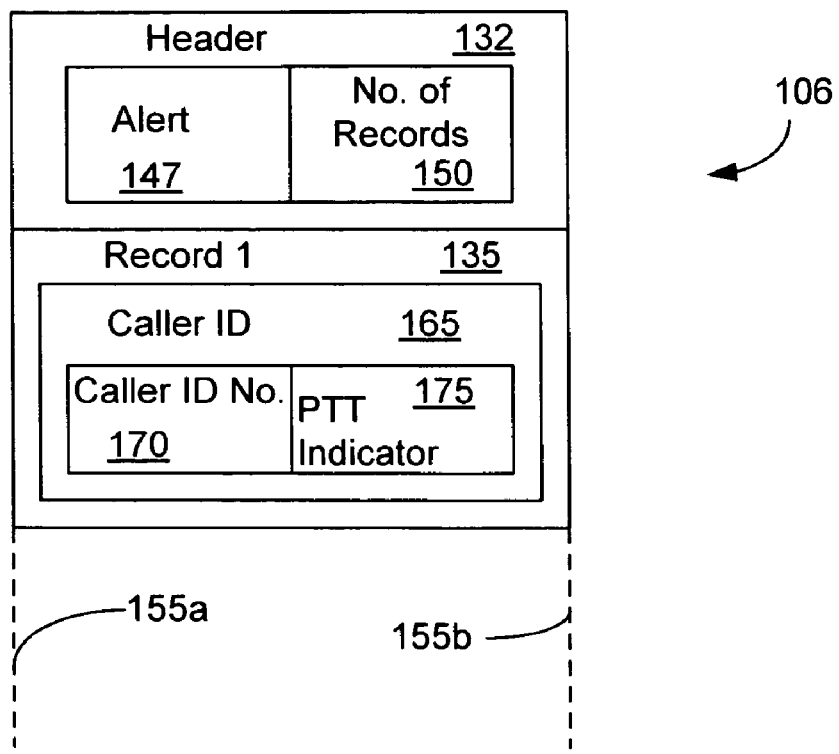
FIG. 2 shows a block diagram illustrating an expanded portion of the incoming call message of FIG. 1.

Referring to FIG. 2, the header 132 contains an alert 147 and an indication 150 of the number of records included in the incoming call message 106. The alert includes notice to the wireless communication device that an incoming call is coming to the wireless communication device. As indicated by arrows 113, 117, 121, 125 and 129, the main control module reads each of the header 132 and the records 135, 138, 141 and 144. While four specific records are shown, there could be more or less records, as indicated by the series of records 1 through n and by the dashed lines 155a and 155b, and, with reference to FIG. 1, 160a and 160b. Referring again to FIG. 2, one of the records 135, 138, 141 and 144 contains a caller ID 165. Record 1 136 is shown in FIG. 2, but it will be understood that any record could be used in place of Record 1 136.

The caller ID 165 contains a caller ID number 170 and a PTT indicator 175. The caller ID number 170 may be a 10 digit number, as is well known in the United States, as a typical telephone number, including wireless telephone numbers. It will be understood that any caller identification that identifies a caller to the wireless communication device could be used, such as, for example, an electronic serial number or a caller's name. The PTT indicator 175 may be any type of PTT indicator, such as, for example, one, two, three or four unique digits appended to the caller ID number 170.

It will also be understood by those of skill in the art that the caller ID number 170 may be a 12 digit group ID number. Such a 12 digit group ID number would be used to designate a PTT group, as is well known by those of skill in the art. PTT group calling will not be described further here, in the interests of brevity and clarity. The PTT indicator 175 may be a 2 digit PTT group call indicator, appended to the caller ID number 170.

Advantageously, the main control module 103 reads the PTT indicator 175 before sending an incoming call signal 111 to the user interface module. Thus, the main control module can send a PTT signal 180 to the user interface with the incoming call signal. This allows the user interface module to avoid going into a standard voice call mode. Typical aspects of a standard voice call mode include (1) causing the wireless communication device to alert the user that a call is coming, such as, for example, by ringing or vibrating, and (2) not waiting for or responding to a PTT attempt to talk, referred to as "taking the floor". Upon receiving the PTT signal 180, the user interface module 109 knows that the incoming call is a PTT call. The user interface module can avoid one or more of the problems of confusing a PTT call for a standard voice call.

To accomplish this, the main control module may perform double pass processing, instead of single pass processing. That is, the main control module may process the incoming call message twice. On the first processing pass, the main control module looks for a PTT indicator. If a PTT indicator is present, the main control module can notify the user interface module that the incoming call message relates to a PTT call. On the second processing pass, the main control task may process the other information in the incoming call message.

Double pass processing is contrary to common wisdom or accepted practice. Normally, single pass processing is preferred, since it seems more logical, and it usually saves in processing power and time. However, contrary to accepted practice, double pass processing may be best here to avoid the problem of interpreting a PTT call as a standard voice call.

If the user interface later receives caller ID information, possibly including PTT information, the user interface may ignore the caller ID information or the PTT information or both, since the user interface has already taken steps to deal with the PTT information.

Alternatively, with minor changes to the network, similar advantages can be achieved. As a first example, if the caller ID with PTT information was always put as the first record in an incoming call message, then the main control module would know whether the call related to a PTT call without performing double pass processing. In this way, the user interface module could be notified that the incoming call message related to a PTT call at the same time that the user interface module was notified of the caller ID. A second example will be discussed below with reference to FIG. 4.

Figure 3:
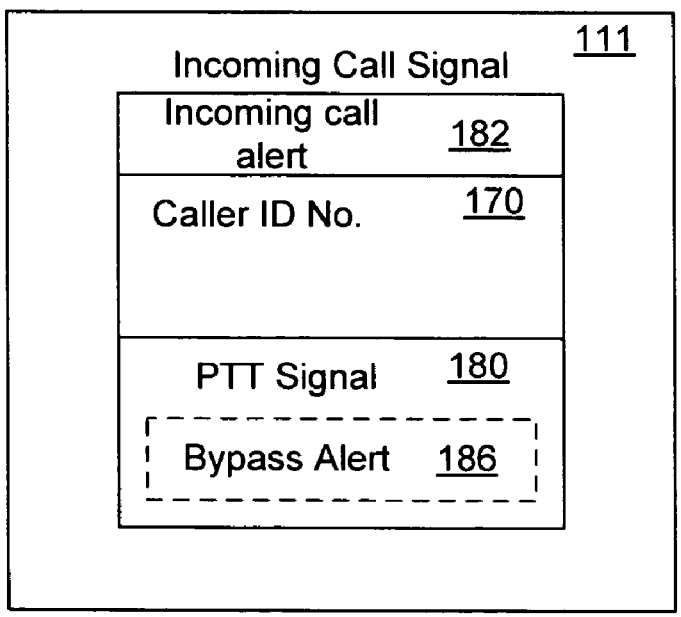
FIG. 3 shows a block diagram illustrating an incoming call signal.

Referring now to FIG. 3, an incoming call signal 111 includes an incoming call alert 182, a caller ID number 170 and a PTT signal 180. It will be understood that the incoming call alert 182 may be implied by either the caller ID number 170 or the PTT signal 180. As such, the incoming call alert may not be included as separate data.

The PTT signal 180 may be any convenient data for conveying to the user interface module that the incoming call message relates to a PTT call. For example, the PTT signal 180 may be the PTT indicator 175 described with reference to FIG. 2 above. Alternatively, for example, the PTT signal may be a separate code or bit designated for signaling whether the incoming call message relates to a PTT call. Alternatively, for example, the PTT signal may include a bypass alert 186. Optionally, the PTT signal may be only the bypass alert signal. The user interface module could be programmed to interpret the bypass alert in certain circumstances as an indication that the incoming call relates to a PTT call.

As is well known in the art, a bypass alert signal is commonly used to tell a user interface module not to alert the user of an incoming call message. A bypass alert message is commonly used for an incoming short message service (SMS) incoming message, as is well known in the art. An SMS message is not a voice call. An SMS message typically carries an ASCII data message, such as a typed message, and has a limited message length. SMS messages are described at length in the industry standard "TIA/EIA-637-B Short Message Services for Wideband Spread Spectrum Systems", which is incorporated in whole herein by reference.

Figure 4:
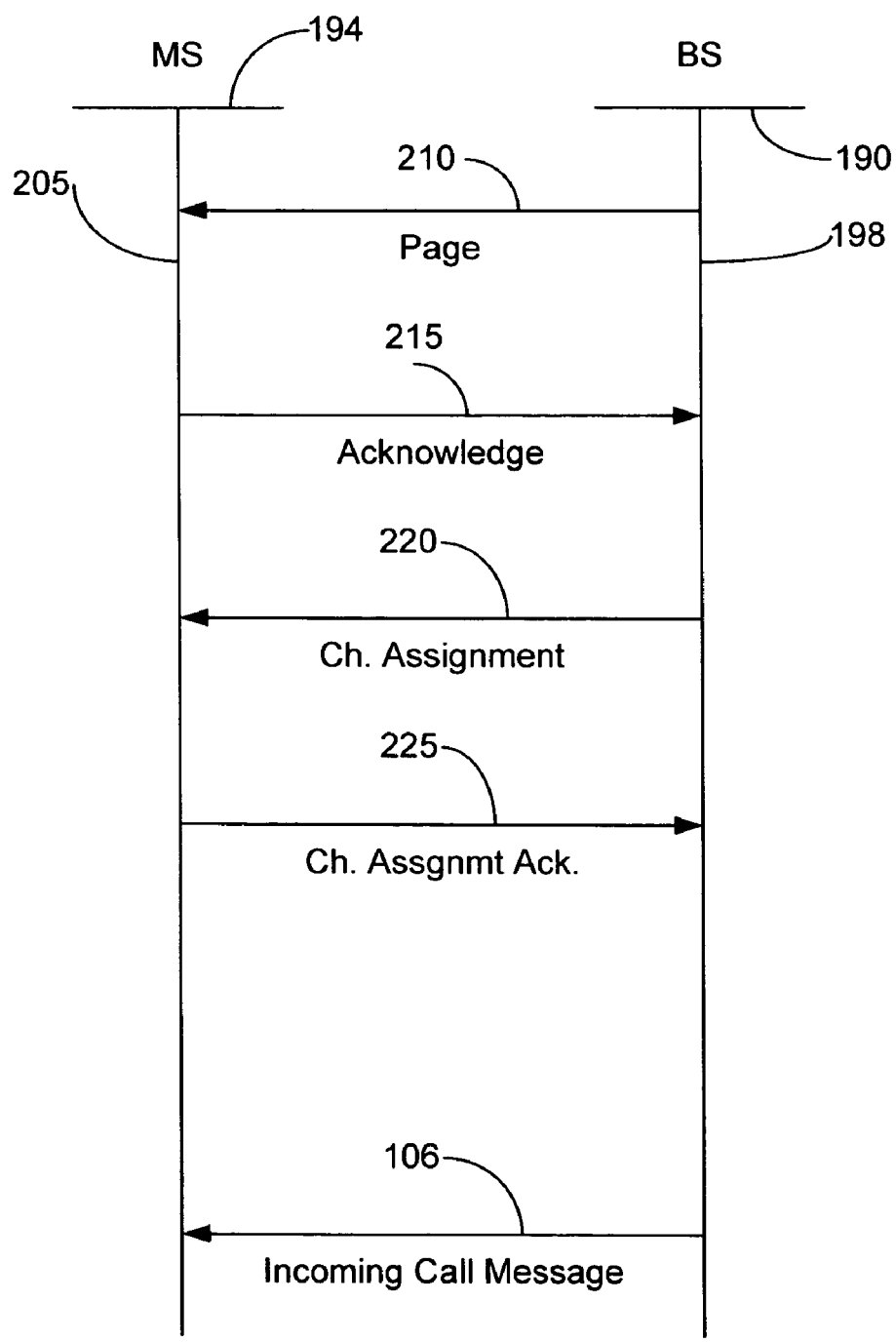
FIG. 4 shows a diagram illustrating communication between a base station and a mobile station for notifying the mobile station regarding an incoming call.

Referring now to FIG. 4, a messaging process for receiving an alert with information carrying a PTT indicator is shown. Messages are sent between a base station 190 and a mobile station 194. A mobile station is a mobile wireless communication device configured to communicate with a base station for connecting to a communications network. A base station is a hub in a communications network, configured to communicate with a plurality of mobile stations. A base station sequence of events 198 is represented by vertical line 198. A mobile station sequence of events 205 is represented by a vertical line 205. Messages from the bases station 190 to the mobile station 194 are shown as horizontal lines with arrows pointing in the direction from the bases station sequence to the mobile station sequence. Messages from the mobile station 194 to the base station 190 are shown as horizontal lines with arrows pointing in the direction from the mobile station sequence to the base station sequence. The events are only shown generally. It will be understood that some details are left out for clarity.

Typically, to initiate a call from another party (not shown) the base station 190 will send a page message 210 to the mobile station 194. The mobile station 194 will typically send an acknowledge message 215, in response to receiving the page. Next, the base station 190 typically sends a channel assignment message 220 to the mobile station 194. In response to the channel assignment message, the mobile station 194 typically sends a channel assignment acknowledge message 115 to the base station. Finally, and after some likely other messaging, as will be understood, the base station typically sends an incoming call message 106. The incoming call message 106 may be an alert with information. The above messaging process may be similar to that described in "TIA/EIA/IS-2000-5-A Sig Layer 3, Upper Layer (Layer 3) Signaling Standard for cdma2000 Spread Spectrum Systems", which has previously been incorporated in whole herein by reference. Advantageously, the alert with information contains a PTT indicator 175. The PTT indicator may be included in the caller ID 165.

The following is a second example of how the main control module could know whether the call related to a PTT call without performing double pass processing. The channel assignment message 220 could be changed to indicate bypass alert for the case of PTT. As a third example, a special PTT channel assignment message field could be allocated for indicating whether an incoming call relates to a PTT call. In this case, the main control task would know that the incoming call message related to a PTT call even before the incoming call message arrived. Finally, as a fourth example, a new Voice-over-voice (VoV) PTT service option could be implemented at the base station with minor changes to the base station software. Wherever the base station supports a message with the service option field present, it could support a new 16 bit service option value for VoV PTT.

Figure 5:
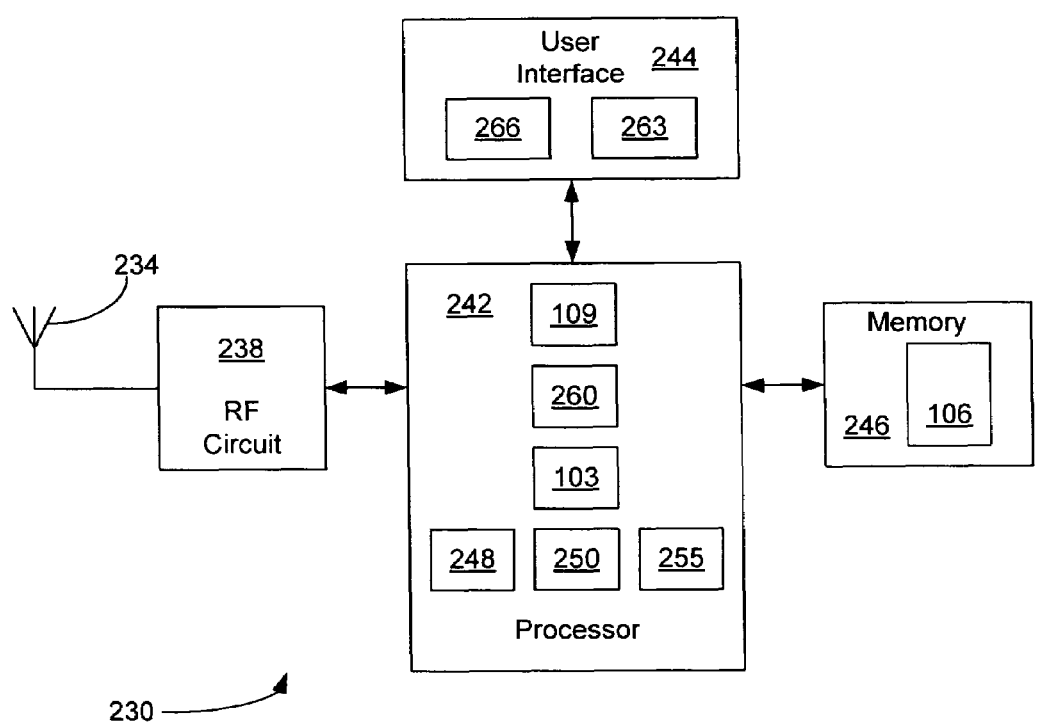
FIG. 5 shows a block diagram illustrating a wireless communication device.

FIG. 5 shows a block diagram illustrating a wireless communication device that may receive and process an incoming call message 106 containing a PTT indicator 175. The wireless communication device 230 has an antenna 234 for receiving electromagnetic radio frequency (RF) signals from the air and transmitting electromagnetic RF signals to the air, that is, for wireless communications. The antenna is coupled to an RF circuit 238 for converting the RF signals into digital signals, and for converting digital signals into RF circuits. The RF circuit will not be described further here, in the interest of brevity. The RF circuit is connected to a processor 242 for receiving the digital signals.

The processor 242 processes the digital signals for presentation to a user interface 244. As will be understood by those of skill in the art, the process is connected to a memory 246 for storing data and software. Several modules are shown in the processor 242. It will be understood that the modules are stored in the memory 246, but they are run by the processor, thus, they are shown functionally in the processor 242.

A receive module (also known as an Rx module) 248 receives the digital signal from the RF circuit 238 and presents the digital signal to the main control module 103. A transmit module 250 and a searcher module 255 are also typically present, for processing information between the RF circuit and the main control module. The transmit module and searcher module will not be described further, in the interest of brevity. The main control module 103 typically presents signals to the call manager module 260, and serves as an interface between the main control module and the user interface module 109. Thus, as described with reference to FIG. 1, when the main control module sends an incoming call signal to the user interface module, this may include sending the incoming call signal to the call manager module and the call manager module sending the incoming call signal to the user interface module.

The user interface 244 includes a speaker 263 and a PTT button 266. As will be understood, other possible aspects of the user interface, such as, for example, a microphone and a display screen are not shown. To ring the wireless communication device, the user interface module would send a signal to the speaker, causing the speaker to emit a sound to audibly alert the user. It will be appreciated that the speaker may be any suitable type of speaker, such as, for example, a quiet speaker or a loud speaker.

The PTT button 266 may be a dedicated PTT button, or it may be a button with more than one function, depending upon an operating mode of the wireless communication device. As will be understood by those of skill in the art, the PTT button can be used to "take the floor" in a PTT call.

Further, while embodiments and implementations of the invention have been shown and described, it should be apparent that many more embodiments and implementations are within the scope of the invention. Accordingly, the invention is not to be restricted, except in light of the claims and their equivalents.

What is claimed is:

1. A method for processing a call in a wireless communication device comprising the steps of:
   receiving an incoming call message;
   reading a push to talk (PTT) indicator in the message at a main control module before sending the incoming call message to a user interface module;
   sending the PTT indicator from the main control module to the user interface module in a first processing pass;
   sending the remaining incoming call message from the main control module to the user interface module in a second processing pass;
   after reading the PTT indicator, sending a PTT signal indicative of the PTT indicator to the user interface module;
   determining whether the incoming call message relates to a PTT call;
   writing a PTT bit to yes or high, responsive to the step of determining;
   combining the incoming call signal and the PTT bit into a single combined alert message, and
   wherein the steps of sending a PTT signal and sending an incoming call signal are performed by sending the combined alert message to the user interface module.

2. The method of claim 1, further comprising the step of:
   transmitting a bypass alert message to the user interface module.

3. The method of claim 2, wherein the step of transmitting further comprises:
   transmitting the bypass alert message from a main control module.

4. The method of claim 3, wherein the incoming call signal comprises an incoming call command.

5. The method of claim 1, wherein the combined alert message comprises an incoming call command.

6. The method of claim 1, wherein the incoming call message comprises a PTT over voice incoming call message.

7. The method of claim 6, further comprising the step of:
   verifying that the incoming call message is a PTT over voice incoming call message.

8. The method of claim 6, wherein the incoming call message comprises a voice PTT over voice incoming call message.

9. A computer readable medium embodying instructions for performing a method of processing a call in a wireless communication device, the method comprising the steps of:
   receiving an incoming call message;
   reading a push to talk (PTT) indicator in the message at a main control module before sending the incoming call message to a user interface module;
   sending the PTT indicator and the incoming call message from the main control module to the user interface module;
   sending the remaining incoming call message from the main control module to the user interface module in a second processing pass;
   after reading the PTT indicator, sending a PTT signal indicative of the PTT indicator to the user interface module;
   determining whether the incoming call message relates to a PTT call writing a PTT bit to yes or high, responsive to the step of determining;
   combining the incoming call signal and the PTT bit into a single combined alert message, and
   wherein the steps of sending a PTT signal and sending an incoming call signal are performed by sending the combined alert message to the user interface module.

10. The computer readable medium of claim 9, the method further comprising the step of:
    transmitting a bypass alert message to the user interface module.

11. The computer readable medium of claim 10, wherein the step of transmitting further comprises:
    transmitting the bypass alert message from a main control module.

12. The computer readable medium of claim 9, wherein the incoming call message comprises a voice over voice incoming call message.

13. The computer readable medium of claim 12, the method further comprising the step of:
    verifying that the incoming call message is a voice over voice incoming call message.

* * * * *